United States Patent [19]

Bayless

[11] 4,107,071
[45] Aug. 15, 1978

[54] METHOD OF PRODUCING MICROCAPSULES AND RESULTING PRODUCT

[75] Inventor: Robert G. Bayless, Yellow Springs, Ohio

[73] Assignee: Capsulated Systems, Inc., Yellow Springs, Ohio

[21] Appl. No.: 768,968

[22] Filed: Feb. 16, 1977

[51] Int. Cl.$^2$ ............................................. B01J 13/02
[52] U.S. Cl. ........................................ 252/316; 264/4; 424/19; 424/33; 424/35; 424/230; 424/271; 427/339; 427/340; 427/352
[58] Field of Search ......................................... 252/316

[56] References Cited

U.S. PATENT DOCUMENTS

| 3,242,051 | 3/1966 | Hiestand et al. ................... 424/33 X |
| 3,674,704 | 7/1972 | Bayless et al. ........................ 252/316 |
| 3,726,804 | 4/1973 | Matsukawa et al. ................. 252/316 |
| 3,816,331 | 6/1974 | Brown, Jr. et al. .................. 252/316 |

Primary Examiner—Richard D. Lovering
Attorney, Agent, or Firm—Dressler, Goldsmith, Clement, Gordon & Shore, Ltd.

[57] ABSTRACT

Microcapsules having a capsule core material surrounded by a relatively impermeable, densified protective wall and a method of producing such microcapsules are disclosed. To produce the microcapsules, an agitated system is provided including a liquid vehicle as a major component of the system and constituting a continuous first phase of the system. A plurality of discrete capsule core material entities are dispersed in the liquid vehicle and constitute a discontinuous second phase. A film-forming, cross-linkable, polymeric base material is also present in the liquid vehicle and, upon induction of phase separation within the agitated system, forms a sheath about the capsule core material entities. The formed sheath also contains entrapped liquid vehicle; however, a major portion of the entrapped liquid vehicle is subsequently extracted from the sheath, and the resulting densified polymeric base material in the sheath is then cross-linked to form a densified protective wall around the capsule core material.

12 Claims, No Drawings

METHOD OF PRODUCING MICROCAPSULES AND RESULTING PRODUCT

BACKGROUND OF THE INVENTION

This invention relates to a method for producing microcapsules, and in one particular aspect to a method for producing microcapsules which contain therein aqueous solutions or watersoluble solid materials.

General encapsulating processes utilizing liquid-liquid phase separation to provide a capsule wall material which envelops the capsule core material to be encapsulated are disclosed in U.S. Pat. No. 3,155,590 to Miller et al., U.S. Pat. No. 3,415,758 to Powell et al. and U.S. Pat. No. 3,748,277 to Wagner et al.; however, the products or the process parameters contemplated by the present invention are not taught therein. In addition, U.S. Pat. No. 3,674,704 to Bayless et al. teaches a specific process for manufacturing minute capsules wherein the capsule wall material is poly(ethylene-vinyl acetate) that is hydrolyzed to a narrowly specified degree (viz, 38 to 55 percent hydrolyzed), but again neither the microcapsules nor the process parameters contemplated herein are taught.

SUMMARY OF THE INVENTION

The present method of producing microcapsules having a capsule core material surrounded by a protective wall is practiced by forming an agitated system which includes (a) a liquid vehicle as a major component of the system and constituting a continuous first phase, (b) a plurality of discrete capsule core material entities dispersed in the liquid vehicle and constituting a discontinuous second phase, and (c) a film-forming, crosslinkable, polymeric base material, such as partially-hydrolyzed poly(ethylene-vinyl acetate) containing about 60 to about 85 mol percent ethylene, having a melt index of about 18 to about 50, that ultimately provides the protective wall for the core material. The polymeric base material is selected so as to wet the capsule core material, i.e., to microencapsulate an aqueous solution a hydrophilic polymeric base material is used. To microencapsulate, a sheath of the cross-linkable polymeric base material and liquid vehicle entrapped therein (i.e., an embryonic microcapsule wall) is formed about the capsule core material entities by inducing liquid-liquid phase separation within the aforesaid system. To this end, a phase separation-inducing material in an amount sufficient to separate the cross-linkable polymeric base material from the continuous first phase can be used, or phase separation can be induced by adjusting the system temperature so that the cross-linkable polymeric base material is rendered less soluble in the liquid vehicle and separates out as a distinct liquid phase. Thereafter at least the major portion of the entrapped liquid vehicle is extracted from the sheath, reducing the thickness and increasing the density thereof, and the densified polymeric base material in the embryonic capsule wall is cross-linked to form a densified protective wall around the capsule core material. The produced microcapsules can then be recovered from the system, washed, and dried to produce a freely-flowing particulate mass.

DESCRIPTION OF PREFERRED EMBODIMENTS

While the film-forming, cross-linkable polymeric base material that is the principal constituent of the microcapsule wall can be any polymer that wets the capsule core material, for the microencapsulation of aqueous or water-soluble core materials partially hydrolyzed poly(ethylene-vinyl acetate) is the preferred base material. Other suitable polymeric base materials are the poly(vinyl-formal) prepolymers, ethylhydroxyethyl cellulose, cellulose acetate butyrate, cellulose acetate phthalate, cellulose acetate propionate, and the like.

It is known from the teachings of U.S. Pat. No. 3,674,704 to Bayless et al. that poly(ethylene-vinyl acetate) hydrolyzed to a narrowly specified degree is a suitable wall-forming material for producing microcapsules that contain aqueous solutions or water-soluble materials. The produced microcapsules nevertheless have walls which tend to release the encapsulated ingredients so quickly that the shelf life of the produced microcapsules is impaired. Moreover, in the environment of intended use, the walls of the prior art microcapsules are so permeable that gradual or controlled release of the capsule core material over an extended period of time cannot be achieved. In addition, the rather strict requirements as to the degree of hydrolysis that are imposed by the aforementioned prior art method necessarily limit the supply of this particular polymeric material that is available for encapsulation purposes.

It has now been found in accordance with one aspect of the present invention that the aforementioned strict requirements as to the degree of hydrolysis for poly(ethylene-vinyl acetate) can be substantially relaxed (20 to 70 percent hydrolysis as compared to 38–55 percent hydrolysis. Also, microcapsules having improved wall permeability characteristics can be produced with any of the aforementioned cross-linkable polymeric base materials by densifying the initially-formed embryonic capsule wall and subsequently cross-linking the polymeric base material present in the densified capsule wall.

In the case of partially-hydrolyzed poly(ethylene-vinyl acetate) this is accomplished by first forming about the capsule core material a sheath of the partially-hydrolyzed poly(ethylene-vinyl acetate) containing liquid vehicle entrapped therein, as in the prior art, and then, in accordance with the present invention, reducing the thickness of the formed sheath, and thereafter cross-linking the partially-hydrolyzed poly(ethylene-vinyl acetate) to form the protective wall which is substantially free from the entrapped liquid vehicle, and is relatively non-porous.

When the capsule wall material is chemically hardened by cross-linking during capsule manufacture, the presence of some hydrolyzed vinyl acetate groups, i.e., vinyl alcohol groups, is necessary in the case of poly(ethylene-vinyl acetate) when practicing the present method. However, the degree of hydrolysis for the poly(ethylene-vinyl acetate) wall-forming material can be within the relatively broad range of about 20 percent to about 70 percent. The partially hydrolyzed copolymers of ethylene and vinyl acetate thus contain ethylene groups, vinyl acetate groups, and vinyl alcohol groups, and can be represented by the general formula

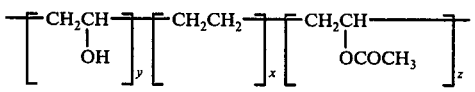

wherein $x$, $y$ and $z$ represent mol fractions of ethylene, vinyl alcohol, and vinyl acetate, respectively. With respect to the degree of hydrolysis, the mol ratio of the vinyl alcohol groups to the sum of vinyl alcohol groups and the vinyl acetate groups present is about 0.2 to about 0.7. The amount of ethylene groups present is also important and can be about 60 to about 85 mol percent, or stated in another way, the mol ratio of ethylene groups to the sum of ethylene groups, vinyl alcohol groups and vinyl acetate groups can be about 0.6 to about 0.85. The partially-hydrolyzed poly(ethylene-vinyl acetate) suitable for practicing the present invention has a molecular weight of the order of about 50,000 and a melt index (using a 2160 gram-force at 190° C. for 10 minutes) of about 18 to about 50, preferably a melt index of about 35 to about 45. The molecular weight of the copolymer is not overly critical, except that if the molecular weight is too high the copolymer will be relatively insoluble in the liquid vehicle that forms a major portion of the encapsulation system and if the molecular weight is too low, it may be difficult to induce phase separation during encapsulation.

To encapsulate a capsule core material, an agitated system is formed in which a plurality of discrete capsule core material entities are dispersed in a liquid vehicle which is a solvent for the cross-linkable polymeric base material. If a phase-separation inducing material is used, the liquid vehicle must also be a solvent for the phase separation-inducing material as will be discussed in greater detail hereinbelow. Additionally, the liquid vehicle must be substantially immiscible with the capsule core material. The liquid vehicle is the major component of the agitated system and constitutes a continuous first phase. The discrete capsule core material entities that are dispersed in the liquid vehicle constitute a discontinuous second phase of the system.

Typical illustrative solvents that can serve as the liquid vehicles for the presently contemplated system are the liquid aromatic hydrocarbons such as toluene, xylene, benzene, chlorobenzene, and the like, as well as the liquid halogenated hydrocarbons such as trichloroethylene, tetrachloroethylene, carbon tetrachloride, methyl chloride, and the like. Also suitable are solvents such as cyclohexane, cyclohexanol, methyl isobutyl ketone, ethylene glycol monobutyl ether, 1-methyl-2-pyrrolidone, pyridine, butanol, and the like. For polymeric base materials that are derived from cellulose, e.g., cellulose acetate butyrate, cellulose acetate phthalate, cellulose acetate propionate, halogenated solvents such as trichloroethylene are preferred. In every instance the solvent has to be compatible with the contemplated cross-linkable polymeric base material, of course.

Size of the discrete capsule core material entities depends on the contemplated end use of the microencapsulated material and is controlled by the intensity of agitation in the system. Of course, the agitation in any event must be sufficient to provide a substantially uniform dispersion of the core material entities in the liquid vehicle while the encapsulation process is carried out. When the capsule core entities are solid materials, the intensity of agitation is primarily determined by the settling characteristics of the solid capsule core entities inasmuch as the entity size is predetermined and produced by grinding, milling, crushing, or similar size reduction expedients.

The liquid vehicle also serves as a carrier for the cross-linkable polymeric base material which is the capsule wall-forming material. Initially this wall-forming material is dissolved in the liquid vehicle; however, when the aforementioned phase separation is induced within the system, the wall-forming material separates out as another discontinuous phase, i.e., a third phase that preferentially wets the capsule core material entities and forms a sheath, or an embryonic capsule wall, therearound. This third phase is a relatively more viscous, relatively concentrated solution or gel of the polymeric base material, e.g., the partially-hydrolyzed poly(ethylene-vinyl acetate) in the liquid vehicle. This third phase is more viscous than the continuous phase and, in addition, is of sufficiently high viscosity to maintain a substantially continuous sheath around the discrete capsule core entities in the system despite the shearing forces incident to the agitation required to maintain these entities in dispersion.

Formation of the capsule core material-enveloping sheath is effected by inducing phase separation within the system. For this purpose a phase-separation material which is a complementary polymeric material also soluble in the liquid vehicle and which causes the polymeric base material to separate out as a third phase can be used. In other words, the phase separation-inducing material brings about the formation of two distinct liquid solution phases (one containing a relatively higher concentration of the wall-forming material and the other containing a relatively higher concentration of the complementary polymeric material) as a result of the liquid-liquid phase separation phenomenon described by Dobry et al., J. Polymer Sci. 2, No. 1, pp. 90-100 (1947).

Suitable phase separation-inducing materials for the present purposes are polymeric materials that exhibit in the system less affinity for the capsule core material entities than does the polymeric base material, thereby causing the latter to deposit preferentially around the dispersed capsule core material entities. In other words, the phase separation-inducing material is incompatible with the polymeric base material. Illustrative phase separation-inducing materials of this type are polymeric materials such as silicone oils, e.g., polydimethyl siloxane, and the like; polyolefins, e.g., polybutadiene having a molecular weight of about 8,000 to about 10,000; polybutene having a molecular weight of about 330 to about 780; and the like. Polymeric materials of this general type are sometimes characterized in the art as "complementary polymeric materials."

Another type of phase separation-inducing material that can be utilized to initially form the embryonic microcapsule wall is a non-polymeric liquid that is a non-solvent for the polymeric base material and the capsule core material but is miscible with the liquid vehicle. Illustrative phase separation-inducing materials of the non-solvent type are the vegetable oils, e.g., the semi-drying oils such as cottonseed oil or corn oil, and the drying oils such as linseed oil, soybean oil, and the like. Other illustrative non-solvents are mineral oils, halogenated mineral oils, liquid saturated alicyclic hydrocarbons such as cyclohexane, cycloheptane, and the like, liquid, saturated straight-chain aliphatic hydrocarbons such as n-hexane, n-heptane, and the like.

To bring about the phase separation and the attendant sheath or embryonic microcapsule wall formation, the wall-forming material, the phase separation-inducing material, and the solvent which serves as the liquid vehicle of the system can be combined in any convenient sequence. Preferably, a dilute solution of the wall-forming material is formed first, and the liquid-liquid phase separation is then effected by the addition of the phase separation-inducing material at an elevated temperature of about 30° C. or higher; however, the order of addition can be reversed, or both the wall-forming material and the phase separation-inducing material can be combined with the liquid vehicle simultaneously.

The quantitative relationships of the wall-forming material and the phase separation-inducing material depend on the particular materials that are used and also on the thickness of the protective wall desired for the capsule core material. In general, the wall-forming material constitutes about 0.5 to about 5 percent (preferably about 1 to about 2 percent) of the total system volume, the phase separation-inducing material constitutes about 1 to about 15 percent (preferably about 8 to about 12 percent) of the total system volume, and the discrete capsule core material entities constitute about 2 to about 30 percent (preferably about 15 to about 20 percent) of the total system volume.

Alternatively, phase-separation can be induced within the system by first forming a solution of the polymeric base material (i.e., the microcapsule wall-forming material) in the liquid vehicle at a predetermined temperature and thereafter changing the solution temperature by heating or cooling to an insolubility temperature for at least a portion of the dissolved polymeric base material. Usually the solution temperature is lowered by at least about 20 degrees F. to effect the embryonic microcapsule wall formation about the capsule core material entities dispersed in the solution; however, in instances where the solubility of the polymeric base material in the liquid vehicle decreases with increasing temperature, phase separation is induced by elevating the temperature of the polymeric base material solution.

A combination of the aforementioned phase separation inducing techniques can also be employed.

The sheath initially formed about the discrete capsule core material entities is a viscous solution or gel of of the capsule wall-forming material, e.g., the partially-hydrolyzed poly(ethylene-vinyl acetate), in which a substantial amount of the liquid vehicle is entrapped. In order to ultimately form the desired protective wall around the discrete capsule core material entities, it is important to extract at least one third of the liquid vehicles from the formed, relatively soft sheath of relatively low density. Preferably about 50 to about 95 volume percent of the liquid vehicle present in the sheath is extracted. As a result, the thickness of the extracted sheath is reduced and the density of the sheath is increased.

Extraction of the entrapped liquid vehicle from the sheath can be accomplished by increasing the concentration of a phase separation-inducing material in the liquid vehicle that surrounds the sheath over and above the concentration necessary to cause the initial liquid-liquid phase separation and sheath formation. To accomplish the desired degree of liquid vehicle extraction from the sheath, the concentration of the phase separation-inducing material in the liquid vehicle surrounding the sheath should be increased by at least about 30 weight percent, and more preferably by at least about 100 weight percent. Alternatively, the extraction of entrapped liquid vehicle can be effected by adjusting the temperature of the encapsulating system so that the entrapped liquid vehicle preferentially migrates into the continuous phase and out of the formed sheath. Preferably, the system temperature is lowered to induce the migration of the entrapped liquid vehicle from the sheath.

The desired extraction of liquid vehicle from the sheath also manifests itself as a reduction in sheath thickness and as an increase in the sheath density. An extraction of at least the major portion of the liquid vehicle from the sheath will result in a sheath thickness reduction of at least about 50 percent and a density increase of at least about 10 percent.

The densified sheath is then hardened by cross-linking the polymeric material present in the sheath. The densified sheath can be chemically hardened by the use of a suitable cross-linking agent which is selected, or course, so as to be compatible with the core material. However, when the densified sheath is to be chemically hardened, it is important that the sheath surrounding the capsule core material is not densified by the liquid vehicle extraction to the degree where a dense, rigid microcapsule wall is produced because the densified sheath at this stage of manufacture must still be permeable to the chemical cross-linking agent and the transport vehicle therefor if such a vehicle is utilized.

Suitable cross-linking agents for this purpose are the diisocyanates or polyisocyanates, e.g., toluene diisocyanate. Particularly preferred is a toluene diisocyanate-trimethylol propane adduct, usually dissolved in an aliquot of the liquid vehicle. Also suitable as cross-linking agents are the diacid halides such as malonyl chloride, oxalyl chloride, sulfonyl chloride, thionyl chloride, and the like. Yet another grouping of suitable hardening agents is illustrated by the alkali alkoxides such as the sodium, potassium, lithium and cesium methoxides, ethoxides, propoxides, and the like.

To effect the desired chemical hardening of the formed sheath, and thereby provide the protective capsule wall, the cross-linking or hardening agent can be dissolved in an aliquot of the liquid vehicle or another compatible solvent and then added to the suspension of sheathed capsule core material entities. Cross-linking can then be carried out at a temperature of about 20° to about 50° C. for a time period of about 5 minutes to about 20 hours, depending on the cross-linking agent that is used. The cross-linking time period when using the acid halides can be about 5 to about 15 minutes, and when using the diisocyanates can be about 5 to about 15 hours, depending on reaction conditions.

The densified microcapsule sheath can also be hardened, i.e., cross-linked, by exposing the sheath to high energy ionizing radiation such as accelerated electrons, X-rays, gamma rays, alpha particles, neutrons, and the like.

Permeability of the produced protective wall of the microcapsules is dependent to a considerable extent on the degree of cross-linking that has been effected, and can be built into the protective wall as desired for a given end use by controlling the degree of cross-linking that takes place.

The hereinabove disclosed encapsulation method is particularly useful for the production of microcapsules containing aqueous solutions and dispersions, water-soluble compounds such as hydroxy-containing organic compounds, polyhydroxy-containing organic compounds, and the like. The present method also lends itself very well to the production of pharmacological preparations having controlled or slow-release properties, e.g., microencapsulated potassium penicillin, microencapsulated aspirin, and the like.

Microcapsules having a considerable size range can be manufactured when practicing the present invention. Microcapsule size can extend from an average diameter of about one micron and less to about several thousand microns and more. The usual size for the produced microcapsules is about 1 micron to about 15,000 microns in average diameter, and is generally in the range of about 5 microns to about 2,500 microns. Similarly, the microcapsules can be manufactured containing varying amounts of core material which can constitute up to about 99 percent or more of the total weight of each microcapsule. Preferably the core material constitutes about 50 to about 97 percent of the total weight of each microcapsule.

The present invention is further illustrated by the following examples.

EXAMPLE I

Manufacture of Microcapsules Having Densified Walls of Cross-Linked Hydrolyzed Poly(Ethylene-Vinyl Acetate)

Poly(ethylene-vinyl acetate) which is about 44 to 52 percent hydrolyzed and having a melt index of about 35 to 37 is dissolved in hot trichloroethylene (about 500 milliliters; about 80° C.) to produce a solution containing about 2 weight-percent hydrolyzed poly(ethylene-vinyl acetate) (HEVA). The obtained solution is then cooled to room temperature with stirring. An aqueous citric acid solution (about 80 milliliters; about 20 wt.-% citric acid) is then added to the cooled trichloroethylene solution of HEVA and emulsified to about 100- to about 500-micron droplets.

Cottonseed oil (about 90 milliliters) is then added to the produced emulsion, followed by toluene diisocyanate (about 5 milliliters) dissolved in trichloroethylene (about 30 milliliters) and more cottonseed oil (about 500 milliliters). The thus produced admixture is then stirred for about 24 hours at ambient temperature, and subsequently discrete microcapsules having a size of about 100 microns to about 500 microns are recovered from the admixture, washed with trichloroethylene and dried. The microcapsules contain aqueous citric acid solution as the core material, surrounded by a relatively non-porous, densified protective wall.

EXAMPLE II

Manufacture of Microcapsules Utilizing Silicone Oil as Phase Separation-Inducing and Wall Densifying Agent Microcapsules containing an aqueous citric acid solution as the core material are prepared in a manner similar to Example I except that polydimethyl siloxane (commercially available under the designation "L-45" from Union Carbide Corporation, New York, N.Y.) is used in lieu of cottonseed oil to induce the phase separation and to densify the capsule walls.

The prepared microcapsules are of good quality and have a relatively non-porous protective wall around the core material.

EXAMPLE III

Manufacture of Microcapsules Utilizing Acid Halide Cross-Linking Agent

Microcapsules containing an aqueous citric acid solution as the core material are prepared in a manner similar to Example I except that malonyl chloride dissolved in trichloroethylene is used as the cross-linking agent in lieu of toluene diisocyanate and is added to the produced emulsion about one hour after all of the cottonseed oil has been added. The admixture produced after the addition of malonyl chloride is agitated for about 15 minutes. Thereafter microcapsules are recovered from the admixture, washed, and dried. The microcapsules have a relatively dense, non-porous wall which surrounds the core material.

EXAMPLE IV

Preparation of Microcapsules Using a Densifying Agent that is Different than the Phase Separation Inducing Agent Poly(ethylene-vinyl acetate) which is about 44 to 52 percent hydrolyzed and has a melt index of about 35 to 37 is dissolved in hot toluene (about 500 milliliters; about 80° C.) to produce a solution containing about 2 weight percent HEVA. The obtained solution is then cooled to about 50° C. with stirring and an aqueous citric acid solution (about 80 milliliters; about 20 wt.-% citric acid) is added thereto and emulsified to aqueous droplets of about 50 to about 200 microns in size. Thereafter cottonseed oil is added to the produced emulsion, and the resulting admixture is cooled in an ice bath to about 20° C. as a HEVA sheath forms about the aqueous droplets.

Polydiemthyl siloxane ("L-45", about 200 milliliters) is slowly added to the cooled admixture to permit a slow shrinkage of the HEVA sheath. After the addition of polydimethyl siloxane is completed, a toluene diisocyanate adduct of trimethylol propane ("Mondur CB-75" of Mobay Chemical Co., Pittsburgh, Pa.; about 10 milliliters) dissolved in toluene (about 30 milliliters) is added with agitation to cross-link the HEVA sheath that has been desified by the addition of polydimethyl siloxane.

To effect cross-linking of the HEVA-sheath, the produced admixture is stirred for about 18 hours, and thereafter about 50- to about 200-micron microcapsules having a densified wall are recovered from the admixture, washed in toluene, and then dried. The dried capsules are of high quality and exhibit no tendency toward exudation of the core material.

EXAMPLE V

Preparation of Microcapsules Utilizing Malonyl Chloride as Cross-Linking Agent

Microcapsules are prepared in a manner similar to Example IV except that malonyl chloride dissolved in toluene (about 4 wt.-% solution; about 50 milliliters) is utilized in lieu of the toluene diisocyanate adduct of trimethylol propane. To effect cross-linking, the produced admixture is stirred for about 10 minutes, and thereafter high quality microcapsules are recovered, washed, and dried.

EXAMPLE VI

Preparation of Microcapsules Utilizing Toluene Diisocyanate as Cross-Linking Agent Microcapsules are prepared in a manner similar to Example IV except that toluene diisocyanate (about 5 milliliters) dissolved in toluene (about 30 milliliters) is utilized as the cross-linking agent. To effect cross-linking, the produced admixture is stirred for about 24 hours, and thereafter high quality microcapsules are recovered, washed, and dried.

EXAMPLE VII

Manufacture of Microcapsules Using HEVA Having a Low Vinyl Alcohol Content

Microcapsules are prepared in a manner similar to Example III using poly(ethylene-vinyl acetate) which is about 25 percent hydrolyzed. Microcapsules of good quality and having densified, relatively non-porous walls are obtained.

EXAMPLE VIII

Manufacture of Microcapsules Using Cellulose Acetate Butyrate

Cellulose acetate butyrate is dissolved in hot chlorobenzene (about 500 milliliters; about 85° C.) to produce a solution containing about 5 weight-percent of cellulose acetate butyrate. The obtained solution is then cooled to about 50° C. and a glycerol-water solution (70/30 vol.-%/vol-%; about 75 milliliters) is added thereto and emulsified to produce core material droplets having an average diameter of about 50 to about 150 microns. Thereafter cottonseed oil (about 60 milliliters) is added to the produced emulsion in order to effect phase separation and cause the formation of a cellulose acetate butyrate sheath around the droplets.

After the cottonseed oil addition, the temperature of the cottonseed oil-containing emulsion is lowered to about room temperature and a solution of malonyl chloride in chlorobenzene (about 5 wt.-%; about 50 milliliters) is added thereto with stirring. The stirring is continued for about 15 minutes after the addition of malonyl chloride is completed and thereafter microcapsules containing the glycerol-water solution and having a densified, relatively non-porous wall are recovered, washed in chlorobenzene, and dried. The produced microcapsules are of high quality and exhibit no tendency toward exudation of microcapsule contents.

EXAMPLE IX

Preparation of Microsapsules Using HEVA of Relatively Low Degree of Hydrolysis

Microcapsules are prepared according to the procedure set forth in Example I using poly(ethylene-vinyl acetate) which is about 36 percent hydrolyzed and has a melt index of about 42. Microcapsules of good quality and having densified, relatively non-porous walls are obtained.

EXAMPLE X

Preparation of Microcapsules Using Partially-Hydrolyzed HEVA

Microcapsules are prepared in accordance with the procedure of Example I using poly(ethylene-vinyl acetate) which is about 41 percent hydrolyzed and has a melt index of about 37. Microcapsules of good quality and having densified, relativelyimpermeable capsule walls are produced.

The foregoing specification and the examples are intended as illustrative and are not to be taken as limiting the present invention. Still other variations of processing parameters within the spirit and scope of this invention will readily present themselves to one skilled in the art.

I claim:

1. A method of producing microcapsules having a capsule core material surrounded by a densified protective wall which comprises
    (1) forming an agitated system which includes (a) a liquid vehicle as a major component of the system and constituting a continuous first phase, (b) a plurality of discrete capsule core material entities dispersed in said liquid vehicle and constituting a discontinuous second phase, and (c) partially-hydrolyzed poly(ethylene-vinyl acetate) containing about 60 to about 80 mol percent ethylene and having a melt index of about 18 to about 50, said capsule core material being wettable by said partially-hydrolyzed poly(ethylene-vinyl acetate);
    (2) adding to said system a phase separation-inducing material in an amount sufficient to separate said partially-hydrolyzed poly(ethylene-vinyl acetate) from said continuous first phase and thereby forming a sheath of said partially-hydrolyzed poly(ethylene-vinyl acetate) and liquid vehicle entrapped therein about said capsule core material entities;
    (3) extracting at least a major portion of the entrapped liquid vehicle from said sheath, thereby reducing the thickness of said sheath, by adding to said system said phase separation-inducing material in an amount sufficient to increase the concentration thereof in said liquid vehicle by at least about 30 weight percent in excess of the concentration required to effect formation of said sheath;
    (4) cross-linking said partially-hydrolyzed poly(ethylene-vinyl acetate) in said sheath to form a protective wall about said capsule core material.

2. The method in accordance with claim 1 wherein about 20 to about 70 percent of vinyl acetate groups in said poly(ethylene-vinyl acetate) are hydrolyzed to vinyl alcohol groups.

3. The method in accordance with claim 1 wherein said liquid vehicle is toluene.

4. The method in accordance with claim 1 wherein said phase separation-inducing material is cottonseed oil.

5. The method in accordance with claim 1 wherein said phase separation-inducing material is polybutadiene having a molecular weight of about 8,000 to about 10,000.

6. The method in accordance with claim 1 wherein the capsule core material is aqueous.

7. The method in accordance with claim 1 wherein the capsule core material is a water-soluble solid.

8. The method in accordance with claim 1 wherein cross-linking is effected by contacting said sheath with a toluene diisocyanate-trimethylol propane adduct.

9. The method in accordance with claim 1 wherein cross-linking is effected by contacting said sheath with toluene diisocyanate.

10. The method in accordance with claim 1 wherein cross-linking is effected by contacting said sheath with malonyl chloride.

11. The method in accordance with claim 1 wherein cross-linking is effected by irradiation.

12. A microcapsule produced in accordance with the method of claim 1.

* * * * *